United States Patent
Kim et al.

(10) Patent No.: US 7,612,841 B2
(45) Date of Patent: Nov. 3, 2009

(54) MOLD FRAME AND LIQUID CRYSTAL DISPLAY HAVING THE SAME

(75) Inventors: Sung Woo Kim, Gyeongsan-si (KR); Hyun Ki Kim, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 550 days.

(21) Appl. No.: 11/472,152

(22) Filed: Jun. 20, 2006

(65) Prior Publication Data

US 2007/0002207 A1 Jan. 4, 2007

(30) Foreign Application Priority Data

Jun. 30, 2005 (KR) .................. 10-2005-0058339

(51) Int. Cl.
*G02F 1/1333* (2006.01)
*F21V 15/00* (2006.01)
(52) U.S. Cl. ........................... 349/58; 362/633
(58) Field of Classification Search ............ 349/58, 349/61, 65; 361/681, 679.26, 679.27; 362/632, 362/633, 634; 445/24; 345/905
See application file for complete search history.

(56) References Cited

U.S. PATENT DOCUMENTS

| 7,086,774 B2 * | 8/2006 | Katsuda et al. ............ 362/634 |
| 7,394,960 B2 * | 7/2008 | Ohtake ...................... 385/129 |
| 2004/0263716 A1 * | 12/2004 | Lee et al. .................... 349/61 |
| 2005/0190317 A1 * | 9/2005 | Wan et al. ................... 349/58 |

FOREIGN PATENT DOCUMENTS

| KR | 1998-063689 | 11/1998 |
| KR | 20060022460 | * 3/2006 |

* cited by examiner

*Primary Examiner*—Dung Nguyen
*Assistant Examiner*—Tai Duong
(74) *Attorney, Agent, or Firm*—Brinks Hofer Gilson & Lione

(57) ABSTRACT

A liquid crystal display includes a liquid crystal panel, a backlight unit emitting light to the liquid crystal panel, the backlight unit including a lamp, a light guide plate, a light diffusing sheet, and a reflective plate, and a mold frame for fixing the liquid crystal panel and the backlight unit. The mold frame has a central opening and includes one or more stopper units formed along an edge of the mold frame, the stopper unit having first and second chamfers.

13 Claims, 5 Drawing Sheets

MOLD FRAME AND LIQUID CRYSTAL DISPLAY HAVING THE SAME

This application claims the benefit of Korean patent application 58339/2005, filed on Jun. 30, 2005, which is incorporated herein by reference.

TECHNICAL FIELD

The present application relates to a liquid crystal display (LCD), and more particularly, to a mold frame that can prevent a lamp from being broken by the movement of a light guide plate.

BACKGROUND

A cathode ray tube (CRT) is generally used as a monitor for a television (TV), a measuring instrument, an information terminal, and the like. However, due to the weight and size of the CRT, it is difficult to reduce the weight and size of an electronic device incorporating a CRT.

In order to replace the CRT, a liquid crystal display (LCD) device having a variety of advantages in terms of the size, weight and electric power consumption has been developed. The LCD has been applied to a variety of electronic devices such as a monitor for a laptop computer as well as a desktop computer and a large-sized display unit. Therefore, it is expected that demand for the LCDs will sharply increased in the future.

The LCD is designed to convert a specific orientation of liquid crystal molecules into other orientations by applying a voltage to the liquid crystal molecules. That is, the LCD is designed to convert the variation of the optical properties such as birefringence, circumpolarization, dichroism, and light scattering into a visual variation. The LCD is a display device using a light modulation by a liquid crystal cell.

Unlike the CRT, the LCD does emit light by itself. Therefore, in order to visually represent an image on a surface of the liquid crystal panel, a light source such as a backlight unit having, for example, a cold cathode fluorescent lamp (CCFL) is needed.

FIG. 1 is a perspective view of a conventional LCD and FIG. 2 is a sectional view taken along line I-I' of FIG. 1. A conventional LCD is generally divided into a liquid crystal panel 8 for display of an image and a backlight unit for emitting light to the liquid crystal panel.

The backlight unit includes a lamp 1 emitting light, a light guide plate 2 for converting the light emitted from the lamp 1 into a surface-emitted light and guiding the surface-emitted light to the liquid crystal panel 8 at a place under the liquid crystal panel 8, a lamp housing enclosing the lamp 1, a reflective plate 4 disposed below the light guide plate 2 to reflect the light toward the liquid crystal panel 8, and an optical sheet unit 5 disposed above the light guide plate 2 to diffuse and focus the surface emitted light from the light guide plate 2. The optical sheet unit 5 includes a diffuser sheet, a prism sheet and a protector sheet.

The liquid crystal panel 8 and the backlight unit are assembled on a mold frame 6 and upper and lower cases 10 and 9 are respectively assembled on upper and lower portions of a mold frame 6 to protect the components from external impact or vibration.

In order to prevent the lamp 1 from being damaged by the movement of the light guide plate in the mold frame, clips 7 are provided at corner regions of the mold frame 6.

The clips 7 are disposed between the lamp 1 and the light guide plate 2. The clips 7 must have sufficient strength such that they can endure an impact force applied by the movement of the light guide plate 2.

As shown in FIG. 3, the mold frame 6 and the light guide plate 2 are assembled with each other and the clips 7 are provided at regions corresponding to end regions of the lamp (not shown).

The clip 7 is formed of a dark metal material and is shaped in a right angle. The clips 7 function to prevent the light guide plate 2 from moving into the lamp region, thereby preventing the lamp from being damaged or broken.

However, this method using the clips 7 cannot sufficiently prevent the lamp from being damaged or broken by the movement of the light guide plate. In an actual impact test, it is noted that the lamps are frequently damaged or broken even when the clips 7 are attached on the mold frame 6.

In addition, the attachment of the clips 7 to the mold frame makes the manufacturing process complicated as an additional tool is required to attach the clips 7. This increases the manufacturing costs. In addition, during the attachment of the clips 7, foreign objects are frequently formed on the backlight unit.

Since the clips 7 are formed of the dark metal material, they reflect the light, thereby forming dark regions at the corner regions of the light guide plate 2, thus deteriorating the luminance of the corner regions of the liquid crystal panel. This results in the deterioration of the overall display quality of the LCD.

Since the clips 7 are formed of the metal, the heat generated from the lamp is transmitted to the light guide plate 2 via the clips 7. This may cause the light guide plate 2 to soften or melt.

SUMMARY

A mold frame is described, having a central opening for fixing a display panel and a backlight unit, the mold frame including one or more stopper units formed along an edge of the mold frame, where the stopper unit may have first and second chamfers.

In another aspect, a liquid crystal display is described including a liquid crystal panel; a backlight unit emitting light to the liquid crystal panel, the backlight unit including a lamp, a light guide plate; a light diffusing sheet, and a reflective plate; and a mold frame for fixing the liquid crystal panel and the backlight unit, where the mold frame may have a central opening and includes one or more stopper units formed along an edge of the mold frame, the stopper units having first and second chamfers.

DETAILED DESCRIPTION

An exemplary embodiment may be better understood with reference to the drawings, but the examples are not intended to be of a limiting nature. Wherever possible, the same reference numbers will be used throughout the drawings to refer to the same or like parts.

Figure 1:
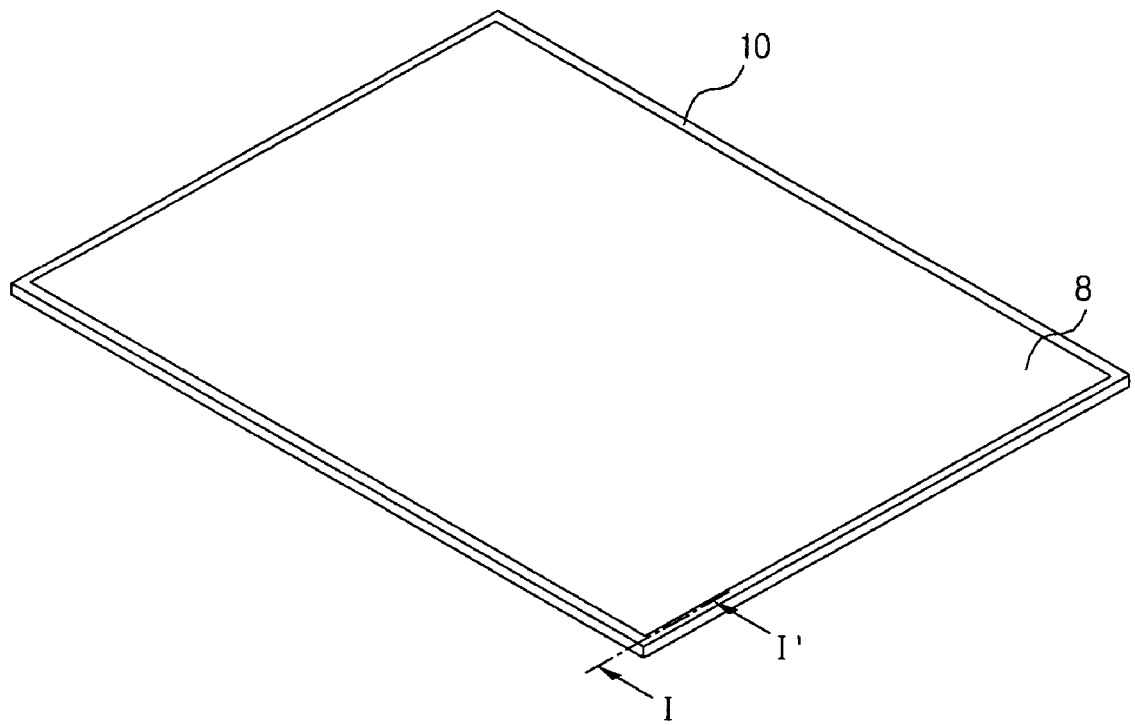
FIG. 1 a perspective view of a conventional LCD.
Figure 2:
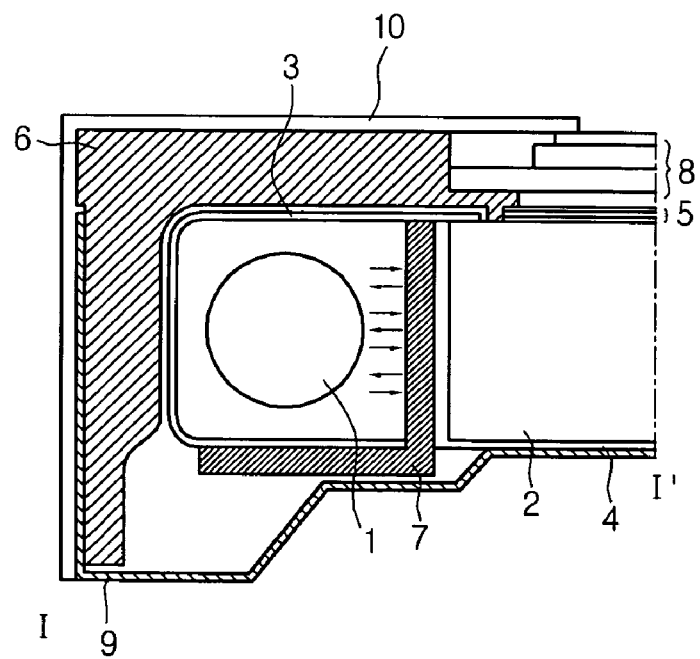
FIG. 2 is a view taken along ling I-I' of FIG. 1.
Figure 3:
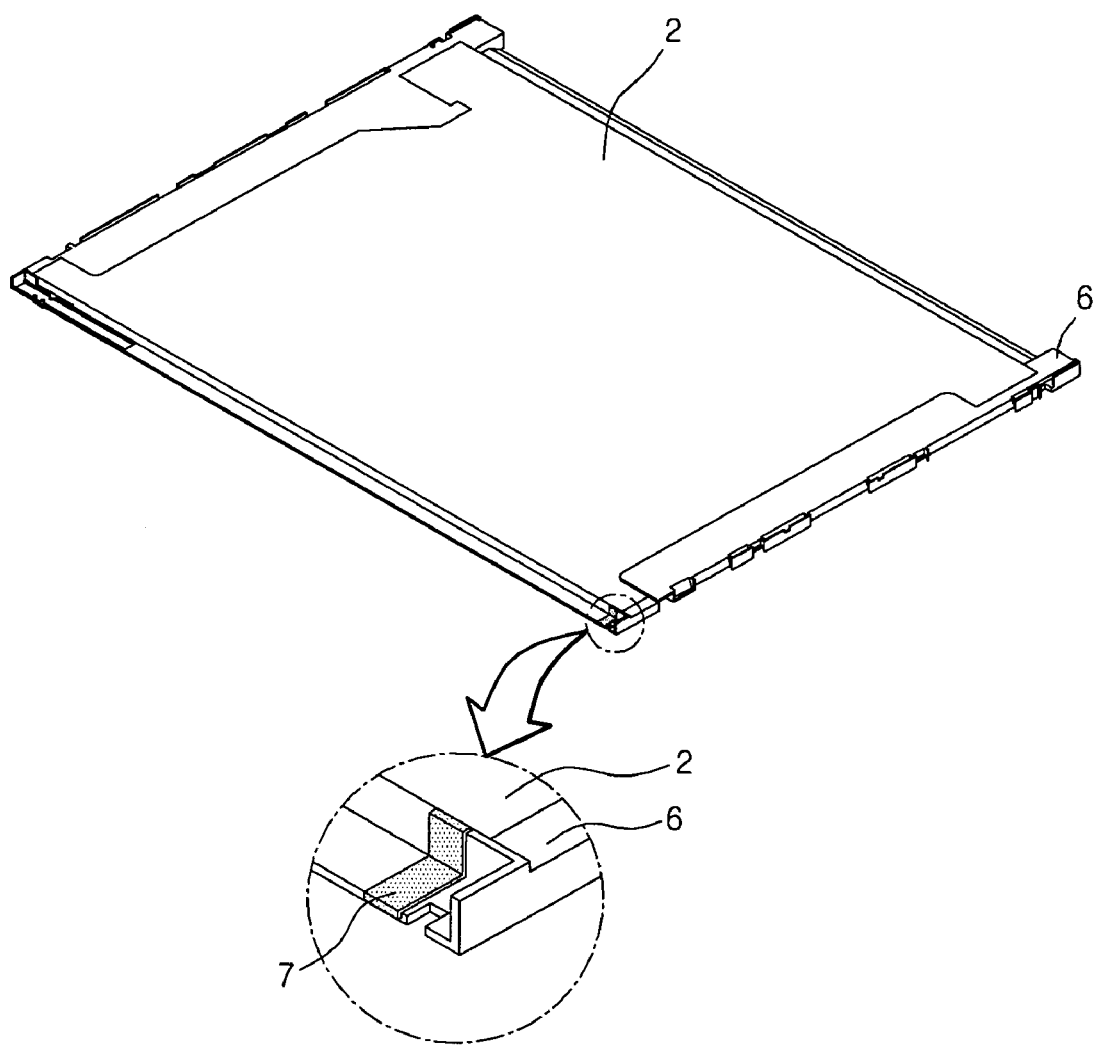
FIG. 3 is a view of the mold frame to which a clip is assembled to prevent a light guide plate from moving.
Figure 4:
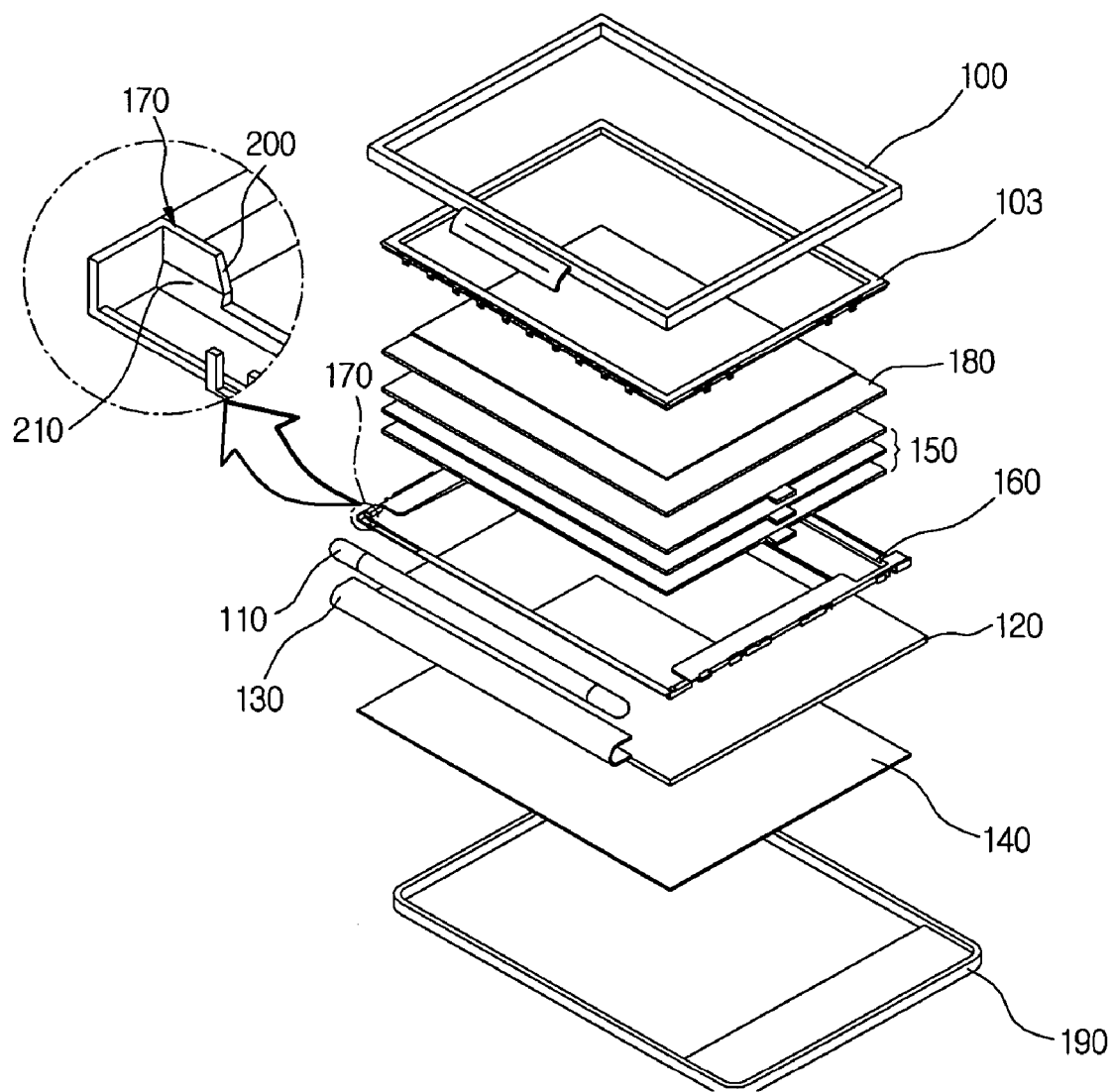
FIG. 4 is an exploded perspective view of an LCD in an example.

In an example shown in FIG. 4, an LCD includes a liquid crystal panel 180 formed by attaching a color filter panel and a TFT panel to each other; a backlight unit for emitting light to the liquid crystal panel; a mold frame 160 for receiving the liquid crystal panel 180 and the backlight unit; and upper and lower cases 100 and 190 assembled on upper and lower portions of the mold frame, respectively.

The backlight unit includes a lamp 110, a lamp housing 130, a reflective plate 140, a light guide plate 120, an optical sheet unit 150, and a panel guide 103 for fixing the liquid crystal panel 180 to the mold frame 160.

The mold frame 160 may be formed in a rectangular shape having an opening corresponding to the liquid crystal panel 180 and the backlight unit. A stopper unit 170 may be integrally formed along an edge of the mold frame 160. The stopper unit 170 includes a first chamfer 210 and a second chamfer 200.

The stopper unit 170 is formed at regions corresponding to both ends of the lamp 110 assembled with the mold frame 160. The second chamfer 200 of the stopper unit 170 partly protrudes from the corner edge region of the mold frame 160 toward a center of the lamp 110 and is formed on a plane parallel to a light incident plane of the light guide plate 120.

The first chamfer 210 of the stopper unit 170 is formed at a region where a bottom surface of the mold frame on which the lamp 110 is disposed intersects the plane where the second chamfer 200 is formed at a right angle. The first chamber 210 has a first inclined surface. The second chamfer 200 of the stopper unit 170 has a second inclined surface formed at the protruding region.

In the stopper unit 170, a portion protruding from the edge corner region of the mold frame 160 toward the center of the lamp 110, parallel with the light incident plane of the light guide plate 120, is provided with the second chamfer 200. The second chamfer 200 does not damage the lamp 110 even when the light guide plate 120 moves. That is, in the stopper unit 170, from the mold frame 160 is not bent toward the lamp region, thereby preventing the lamp from being damaged.

Since the first chamfer 210 of the stopper unit 110 has an inclined surface formed under a plane where the second chamfer 200 is formed, it can resist the impact generated by the movement of the light guide plate 120, thereby preventing the lamp 110 from being damaged by movement of the light guide plate 120 into the lamp region 110.

The stopper unit 170 may be integrally molded together with the mold frame 160 using an identical material. Alternatively, a separate stopper unit having the first and second chamfers 210 and 220 may be coupled to the mold frame 160 using an adhesive or a fastener.

Figure 5:
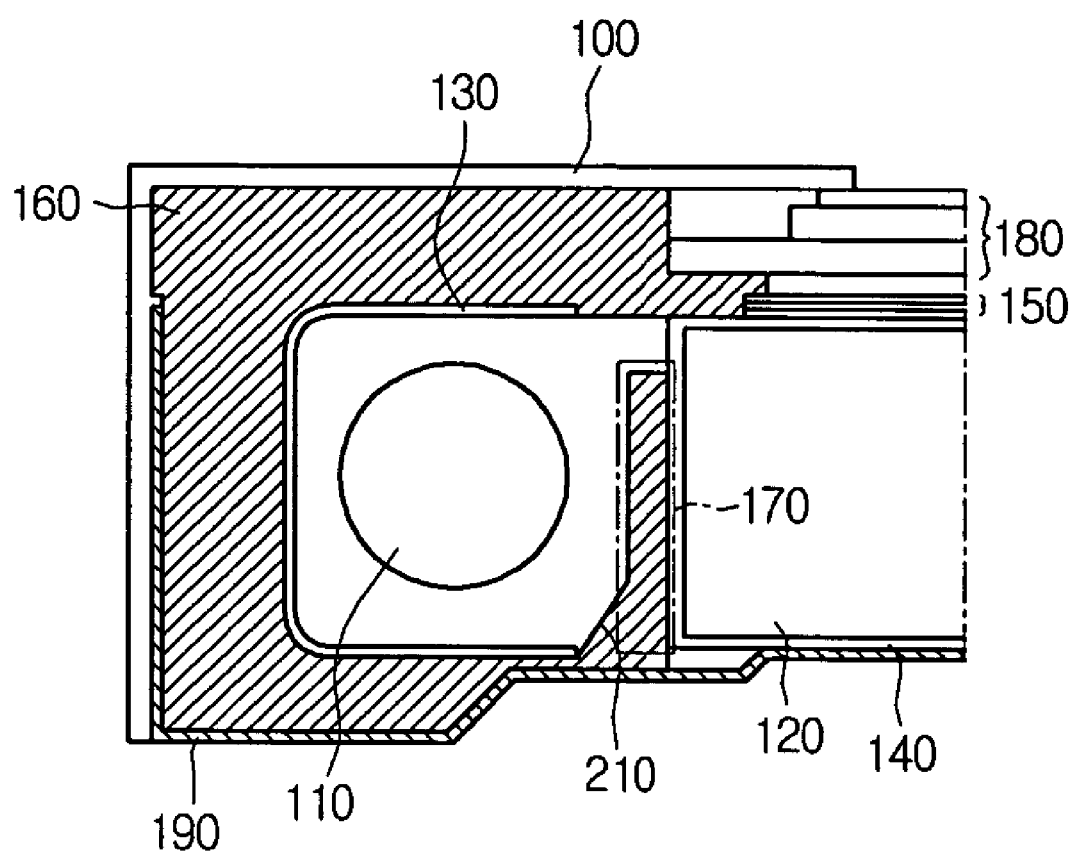
FIG. 5 is an enlarged sectional view of a lamp region of the LCD of FIG. 4.

As shown in FIG. 5, the lamp 110 is fixed to the lamp housing 130 and disposed inside of the mold frame 160. The light guide plate 120 is disposed adjacent to the lamp 110. The reflective plate 140 is disposed below the light guide plate 120 and the optical sheet unit 150 is disposed above the light guide plate 120.

The optical sheet unit 150 may include a diffusion sheet, a prism sheet and a protector sheet. The diffusion sheet functions to diffuse the light emitted from the lamp 110. The prism sheet may be a multi-prism bar type having a plurality of protrusions. The prism sheet functions to focus the diffused light in a direction perpendicular to the liquid crystal display panel.

The protector sheet may function to protect protruding prisms of the prism sheet. The protector sheet may further function to allow the focused light by the prism sheet to travel toward the liquid crystal panel 180.

The liquid crystal panel 180 may be fixed by the mold frame 160 and disposed above the optical sheet unit 150. The upper and lower cases 190 are assembled to enclose the overall body of the mold frame 160.

The stopper unit 170 may be integrally formed with the mold frame 160 between the light guide plate 120 and the lamp 110. The first chamfer 210 may be formed at a region where the stopper unit 170 intersects the mold frame 160 at a right angle, to securely support the stopper unit 170.

The first chamfer 210 of the stopper unit 170 may function to prevent the light guide plate 120 from moving into the lamp region in response to external vibration or impact. In order to prevent an edge corner region of the stopper unit 170 from being bent by the movement of the light guide plate 120, the corner region of the stopper unit 170 is provided with an inclined surface defined by the second chamfer 200 (see FIG. 4 or FIG. 6).

The stopper unit 170 may be integrally molded together with the mold frame 160 using an identical material. Alternatively, a separate stopper unit having the first and second chamfers 210 and 220 may be coupled to the mold frame 160 usin an adhesive or fasteners. In another aspect, a plurality of stopper units 170 may be formed along ends of the mold frame 160 at intervals.

The lamp 110 may be an EEFL or a CCFL, or the like. The light guide plate 120 converts the incident light from the lamp 110 into a surface-emitted light. The light guide plate 120 may be formed, for example, of polymethylmethacrylate, a polymer that has a high strength and a high transmissivity.

The stopper unit 170 may be modified to having a variety of chamfers.

Figure 6:
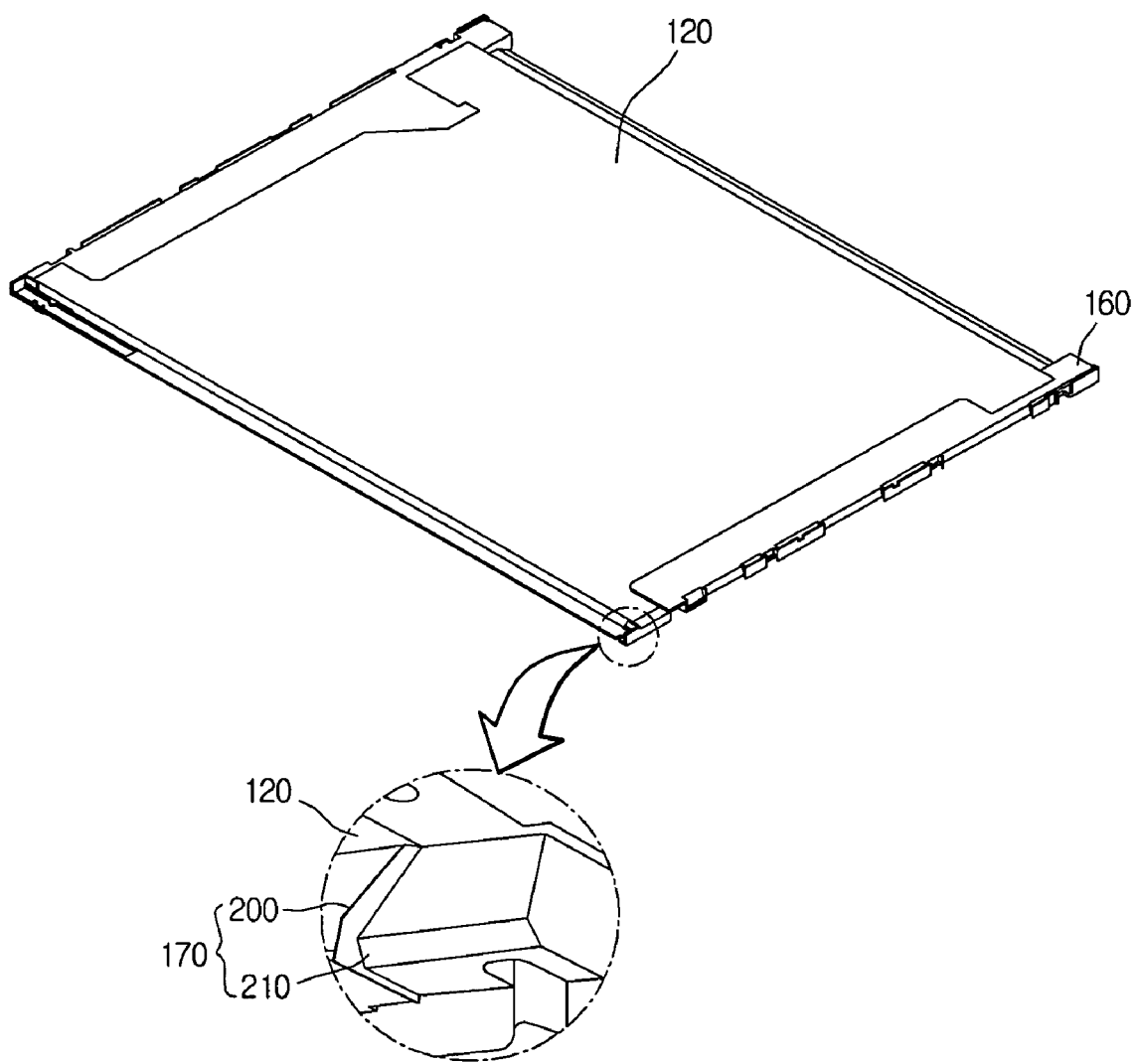
FIG. 6 is a view of a mold frame on which a fixing unit is formed in the example.

FIG. 6 is a view of a mold frame on which a fixing unit is formed. The stopper unit 170 is formed at an edge region of the mode frame 160 to restrain the light guide plate 120 at an edge region of the mold frame 160. That is, at the regions corresponding to the ends of the lamp 110, the stopper unit 170 prevents the light guide plate 120 from moving into the lamp region.

In order to resist the impact generated by the movement of the light guide plate 120, the stopper unit includes a first chamfer 210 enhancing the strength against impact from the light guide plate and the second chamfer 200 preventing the corner region of the stopper unit 170 from being bent toward the lamp by the collision against the light guide plate 120.

The second chamfer 200 also provides a space through which the light can pass, reducing the darkening problem caused by the clip of the conventional LCD. That is, the second chamfer 200 functions not only to prevent the second chamfer region of the stopper unit 170 from being bent by the movement of the light guide plate 120 but also to enhance the intensity of the incident light from the lamp, thereby preventing the deterioration of the luminance at the edge regions of the screen.

Therefore, by forming the stopper unit 170 of the present invention during the molding process for the mold frame 160, the stopper unit 170 prevents the lamp from being broken by the movement of the light guide plate 120 even when there is no clip.

Furthermore, since a space for transmitting light is formed by the second chamfer 200, the darkening problem can be mittigated. In addition, since the stopper unit can be formed of a plastic material having a relatively low heat transfer rate, the melting or softening of the light guide plate by the heat generated by the lamp can be prevented.

The stopper unit formed with the mold frame can prevent the lamp from being broken by external impact and enlarge the light incident area from the lamp to improve the luminance at the edges of the liquid crystal panel.

Since the stopper unit can be integrally molded with the mold frame, no additional manufacturing process is required, thereby simplifying the manufacturing process and reducing the manufacturing costs.

Although the present invention has been explained by way of the example described above, it should be understood to a person or ordinary skill in the art that the invention is not limited to the example, but rather that various changes or modifications thereof are possible without departing from the spirit of the invention. Accordingly, the scope of the invention shall be determined only by the appended claims and their equivalents.

What is claimed is:

1. A mold frame adapted to retain a display panel and a backlight unit, the mold frame comprising:
   a stopper unit formed along an edge of the mold frame, the stopper unit having first and second chamfers,
   wherein the second chamfer of the stopper unit has an inclined surface formed at a region where a plane of the second chamfer crosses the mold frame at a right angle.

2. The mold frame according to claim 1, wherein the stopper unit is formed at an end of the mold frame adapted to receive a backlight unit.

3. The mold frame according to claim 1, wherein the first and second chamfers are first and second inclined surfaces, respectively.

4. The mold frame according to claim 1, wherein the first chamfer of the stopper unit protrudes from the mold frame in a plane parallel to that of a light incident plane of the light guide plate of the backlight unit.

5. The mold frame according to claim 1, wherein the stopper unit is integrally formed with the mold frame.

6. A liquid crystal display comprising:
   a liquid crystal panel;
   a backlight unit, including a lamp, a light guide plate, a light diffusing sheet, and a reflective plate; and
   a mold frame adapted to retain the liquid crystal panel and the backlight unit,
   wherein the mold frame has a stopper unit formed along an edge of the mold frame, the stopper unit having first and second chamfers,
   wherein the second chamfer of the stopper unit has an inclined surface formed at a region where a plane of the second chamfer crosses the mold frame at a right angle.

7. The liquid crystal display according to claim 6, wherein the stopper unit is formed at an end of the mold frame to which the backlight unit is fixed.

8. The liquid crystal display according to claim 6, wherein each of the first and second chamfers has a first and a second inclined surface, respectively.

9. The liquid crystal display according to claim 6, wherein the first chamfer of the stopper unit protrudes from the mold frame in a plane parallel to a light incident plane of the light guide plate of the backlight unit.

10. The liquid crystal display according to claim 6, wherein the stopper unit is integrally formed with the mold frame.

11. The liquid crystal display according to claim 6, wherein the stopper unit is formed at a corner region of the mold frame where the backlight is fixed.

12. The liquid crystal display according to claim 6, wherein the second chamfer is formed having an inclined surface at a corner region where a horizontal plane of the mold frame intersects a vertical plane including the first chamfer.

13. The liquid crystal display according to claim 6, wherein the second chamfer of the stopper unit is an inclined surface at a corner region.

* * * * *

UNITED STATES PATENT AND TRADEMARK OFFICE
CERTIFICATE OF CORRECTION

PATENT NO.       : 7,612,841 B2
APPLICATION NO.  : 11/472152
DATED            : November 3, 2009
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Nineteenth Day of October, 2010

David J. Kappos
*Director of the United States Patent and Trademark Office*